United States Patent
Wang et al.

(10) Patent No.: US 11,510,305 B1
(45) Date of Patent: Nov. 22, 2022

(54) STATIC RESISTANT FAN APPARATUS

(71) Applicant: Dell Products L.P., Round Rock, TX (US)

(72) Inventors: Isaac Q. Wang, Austin, TX (US); Qinghong He, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/444,580

(22) Filed: Aug. 6, 2021

(51) Int. Cl.
| | | |
|---|---|---|
| *F04D 19/00* | (2006.01) | |
| *H05F 3/02* | (2006.01) | |
| *G06F 1/20* | (2006.01) | |
| *F04D 29/32* | (2006.01) | |
| *F04D 29/053* | (2006.01) | |

(52) U.S. Cl.
CPC .............. *H05F 3/02* (2013.01); *F04D 19/002* (2013.01); *F04D 29/053* (2013.01); *F04D 29/324* (2013.01); *G06F 1/20* (2013.01)

(58) Field of Classification Search
CPC ........ F04D 19/02; F04D 19/002; F04D 25/08; H05F 3/02; H05K 6/0064; H05K 6/0079
See application file for complete search history.

(56) References Cited

U.S. PATENT DOCUMENTS

| | | | | |
|---|---|---|---|---|
| 10,651,709 B2* | 5/2020 | Pacilli | ..................... | F04D 17/16 |
| 10,779,449 B1* | 9/2020 | Cananzi | ............. | H05K 7/20145 |
| 11,181,114 B2* | 11/2021 | Kim | ........................ | H02K 11/40 |

* cited by examiner

*Primary Examiner* — Richard A Edgar
*Assistant Examiner* — Behnoush Haghighian
(74) *Attorney, Agent, or Firm* — McDermott Will & Emery LLP

(57) ABSTRACT

A static resistant fan apparatus, comprising: a conductive shaft; a first conductive fan blade connected to the conductive shaft and extending away from the conductive shaft; a second conductive fan blade connected to the conductive shaft and extending away from the conductive shaft opposite to the first conductive fan blade; a conductive support structure surrounding the conductive shaft, wherein an inner edge of the support structure is spaced apart from the conductive shaft a distance; and a conductive ground pass coupled between the conductive shaft and the support structure and spanning the distance, wherein the conductive shaft, the conductive support structure, and the conductive ground pass provide a path to ground for the first conductive and the second conductive fan blades.

20 Claims, 5 Drawing Sheets

STATIC RESISTANT FAN APPARATUS

BACKGROUND

Field Of The Disclosure

The disclosure relates generally to an information handling system, and in particular, a static resistant fan apparatus for an information handling system.

Description Of The Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Thermal-related issues are a common cause of failure of information handling systems. When an information handling system operates with inadequate cooling, the processor operating temperature can rise rapidly above thresholds and cause a processor to throttle. If the temperature is allowed to rise even higher, a thermal trip is triggered and the processor can automatically shut down. A cooling solution can prevent such situations from arising. However, the cooling capacity of the cooling solution can degrade over time—what the cooling solution is able to initially cool may not be the same after one year of heavy use. This degradation can be attributed to many factors, including accumulation of dirt/dust on fan blades. As a result, the processor may only get a fraction amount of cooling it's designed to get and therefore overheats quickly, leading to the processor operating at a reduced clock rate and performance degradation.

SUMMARY

Innovative aspects of the subject matter described in this specification may be embodied in a static resistant fan apparatus, including: a conductive shaft; a first conductive fan blade connected to the conductive shaft and extending away from the conductive shaft; a second conductive fan blade connected to the conductive shaft and extending away from the conductive shaft opposite to the first conductive fan blade; a conductive support structure surrounding the conductive shaft, wherein an inner edge of the support structure is spaced apart from the conductive shaft a distance; and a conductive ground pass coupled between the conductive shaft and the support structure and spanning the distance, wherein the conductive shaft, the conductive support structure, and the conductive ground pass provide a path to ground for the first conductive and the second conductive fan blades.

Other embodiments of these aspects include corresponding systems and apparatus.

These and other embodiments may each optionally include one or more of the following features. For instance, the conductive ground pass includes one or more flexible fingers. One or more of the one or more flexible fingers are in contact with the conductive support structure and the conductive shaft at a time. An additional conductive ground pass connected to an outer edge of the conductive support structure, wherein the conductive shaft, the conductive support structure, the conductive ground pass, and the additional conductive ground pass provide the path to ground for the first conductive and the second conductive fan blades. The additional conductive ground pass includes one or more flexible fingers. One or more of the one or more flexible fingers are in contact with the conductive support structure at a time. A ground wire coupled to the additional conductive ground pass, wherein the conductive shaft, the conductive support structure, the conductive ground pass, the additional conductive ground pass, and the ground wire provide the path to ground for the first conductive and the second conductive fan blades. The first conductive and the second conductive fan blades comprise electrostatic discharge (ESD) material. The first conductive and the second conductive fan blades comprise a zero-charge anti-static coating on plastic. The first conductive and the second conductive fan blades comprise metal.

Particular implementations of the subject matter described in this specification can be implemented so as to realize one or more of the following advantages. For example, efficiency of cooling of an information handling system is improved, as well as reduction in acoustic noise issues with the information handling system is reduced.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
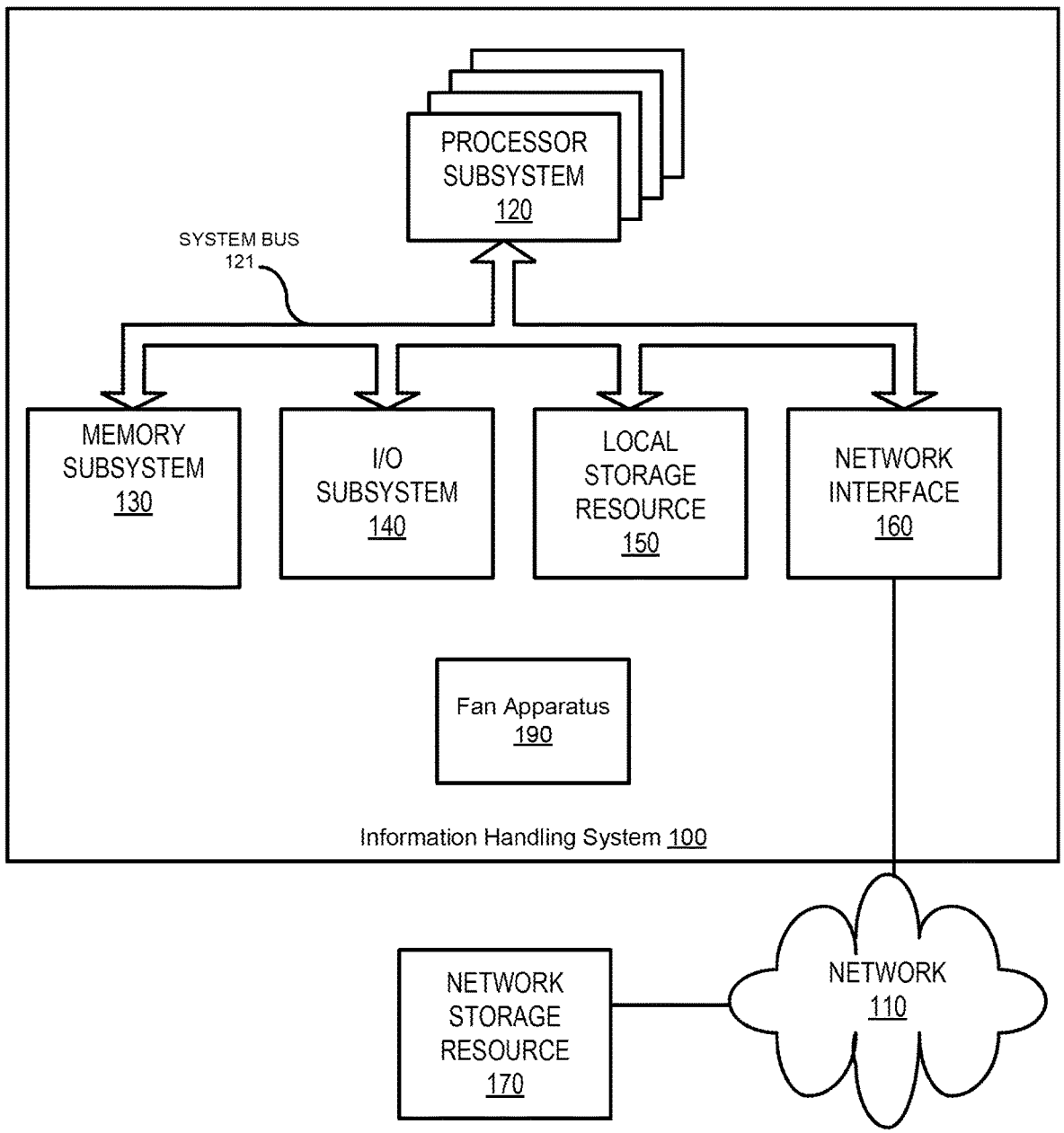
FIG. 1 is a block diagram of selected elements of an embodiment of an information handling system.

This disclosure discusses methods and systems for a static resistant fan apparatus of an information handling system. In short, an environment of an information handling system (internal to the information handling system or external to the information handling system) can include dust, and in particular, electrically charged (dust) particles. The electrically charged particles can be attracted to any surface of the information handling system, including a fan apparatus. As the fan apparatus operates and rotates within the information handling system, the fan apparatus can experience frictional forces (with surrounding air molecules), causing fan blades of the fan apparatus to build a net charge. The charged particles can then be attracted to the charged fan blades. The fan apparatus can include a path to ground for the charged particles, such that particle accumulation on the fan apparatus is reduced, minimized, and/or prevented.

Specifically, this disclosure discusses a system and a method for a static resistant fan apparatus, including a conductive shaft; a first conductive fan blade connected to the conductive shaft and extending away from the conductive shaft; a second conductive fan blade connected to the conductive shaft and extending away from the conductive shaft opposite to the first conductive fan blade; a conductive support structure surrounding the conductive shaft, wherein an inner edge of the support structure is spaced apart from the conductive shaft by a distance; and a conductive ground pass coupled between the conductive shaft and the support structure and spanning the distance, wherein the conductive shaft, the conductive support structure, and the conductive ground pass provide a path to ground for the first conductive and the second conductive fan blades.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a fan apparatus 190. The fan apparatus 190 can provide air cooling of any of the components (processor subsystem 120, memory subsystem 130, I/O subsystem 140, local resource storage 150, network interface 160) of the information handling system 100.

In short, an environment of the information handling system 100 (internal to the information handling system 100 or external to the information handling system 100) can include dust, and in particular, electrically charged (dust) particles. The electrically charged particles can be attracted to any surface of the information handling system 100, including the fan apparatus 190. As the fan apparatus 190 operates and rotates within the information handling system 100, the fan apparatus 190 can experience frictional forces, causing fan blades of the fan apparatus 190 to build a net charge. The charged particles can then be attracted to the charged fan blades. The fan apparatus 190 can include a path to ground for the charged particles, such that particle accumulation on the fan apparatus 190 is reduced, minimized, and/or prevented.

Figure 2:
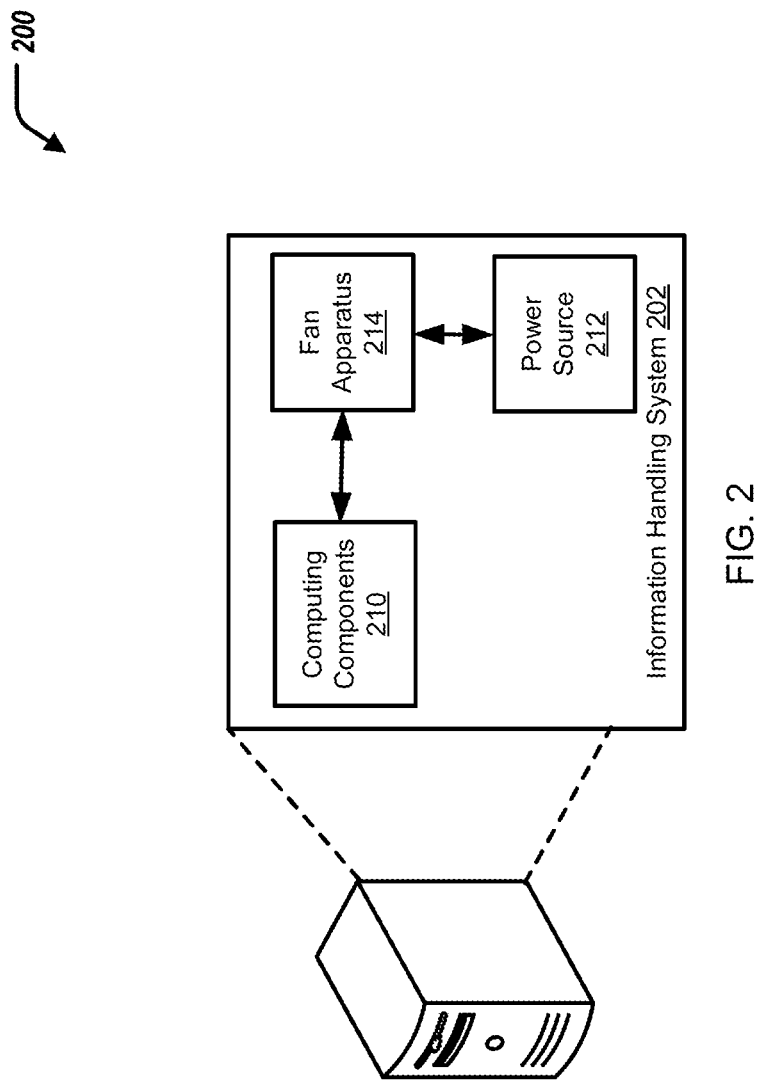
FIG. 2 illustrates a block diagram of an information handling system including a static resistant fan apparatus.

Turning to FIG. 2, FIG. 2 illustrates an environment 200 including an information handling system 202. The information handling system 202 can include computing components 210, a power source 212, and a (static resistant) fan apparatus 214. In some examples, the information handling system 202 is similar to, or includes, the information handling system 100 of FIG. 1. In some examples, the fan apparatus 214 is the same, or substantially the same, as the fan apparatus 190 of FIG. 1. The power source 212 can provide power to the fan apparatus 214 for operation of the fan apparatus 214. The fan apparatus 214 can provide (air) cooling of any portion or component of the information handling system 202, including the computing components 210, described further herein.

Figure 3:
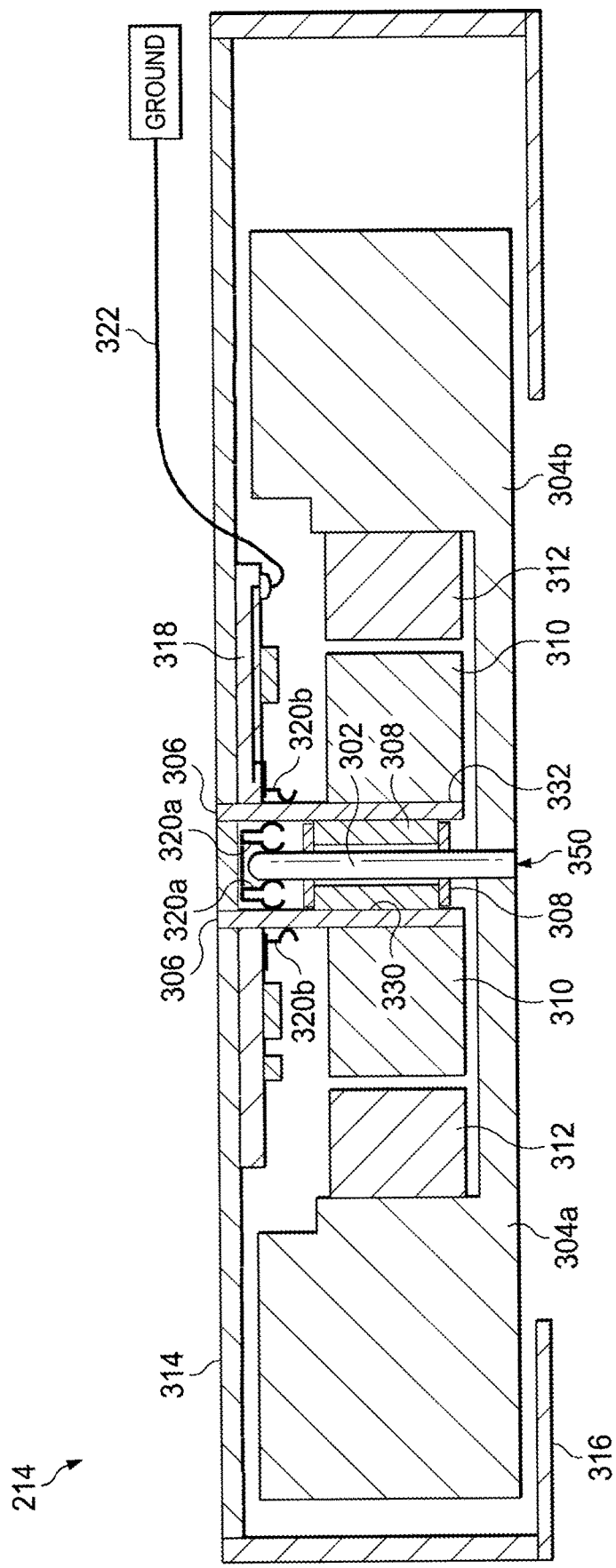
FIGS. 3, 6 illustrate respective block diagrams of the static resistant fan apparatus.

FIG. 3 illustrates a cut-away side view of a block diagram of the static resistant fan apparatus 214. The fan apparatus 214 can include an electrically conductive shaft 302, a first conductive fan blade 304*a*, a second conductive fan blade 304*b* (collectively referred to as conductive fan blades 304 or fan blades 304), a conductive support structure 306, bearing 308, stators 310, magnets 312, a base 314, a fan cover 316, and a printed circuit board (PCB) 318. The fan apparatus 214 can further include a first conductive ground pass 320*a* and a second conductive ground pass 320*b* (collectively referred to as conductive ground passes 320). The fan apparatus 214 can further include a ground wire 322 that is ultimately connected to ground.

The bearing 308 can surround the conductive shaft 302. In some examples, the bearing 308 surrounds an entirety of the conductive shaft 302, or a portion of the conductive shaft 302. In some examples, the bearing 308 includes a ceramic sleeve or a ball bearing.

The conductive support structure 306 surrounds the conductive shaft 302. In particular, the bearing 308 is positioned between the conductive support structure 306 and the conductive shaft 302. The conductive support structure 306 can extend between the base 314 and proximate to the fan blades 304. The conductive support structure 306 can include an inner edge 330 and an outer edge 332. The inner edge 330 can be spaced-apart from the conductive shaft 302 by a small distance.

In some examples, the conductive shaft 302, the conductive support structure 306, and the ground wire 322 are conductive. For example, an entirety or at least a portion of the conductive shaft 302, the conductive support structure 306, and the ground wire 322 are formed from conductive materials such as metal, or metal-based materials.

The stators 310 can be coupled to the conductive support structure 306 and extend away from the conductive support structure 306. The stators 310 can substantially surround the conductive support structure 306.

The first conductive fan blade 304a and the second conductive fan blade 304b can be connected to the conductive shaft 302 at region 350. The first conductive fan blade 304a can extend away from the conducive shaft 302 in a first direction; and the second conductive fan blade 304b can extend away from the conductive shaft 302 in a second direction opposite to the first direction. In some examples, the fan blades 304 can be considered a single fan blade 304. In some examples, the first conductive fan blade 304a and the second conductive fan blade 304b are connected, forming a congruent fan blade. The fan blades 304 can rotate about the conductive shaft 302. In some examples, the fan blades 304 comprise (are formed from) an anti-static material. For example, the fan blades 304 comprise (formed from) an electrostatic discharge (ESD) material. For example, the fan blades 304 comprise (formed from) a zero charge anti-static coating on plastic. For example, the fan blades 304 comprise (formed from) metal materials, at least partially or in whole.

The magnets 312 can be coupled to respective fan blades 304 and positioned adjacent to the stators 310. The magnets 312 can substantially surround the stators 310 and the conductive support structure 306. The magnets 312 and the stators 310 facilitate rotation of the fan blades 304 with respect to the conductive shaft 302 (e.g., clockwise rotation and/or counter-clockwise rotation).

The PCB 318 can provide control/management of the fan apparatus 214, and in particular, rotation of the fan blades 304.

In some examples, the conductive ground pass 320a is positioned between the conductive shaft 302 and the conductive support structure 306. That is, the conductive ground pass 320a spans the distance between the conductive shaft 302 and the conductive support structure 306. The conductive ground pass 320a is in contact with both the conductive shaft 302 and the conductive support structure 306 concurrently (simultaneously).

The ground wire 322 is coupled to the conductive ground pass 320b. In some cases, the PCB 318 includes the ground wire 322. The ground wire 222 can be one or multiple wires that connect the fan apparatus 214 to a motherboard via the PCB 318. In some cases, the ground wire 322 is soldered to the PCB 318, or cabled via a connector.

Figure 4:
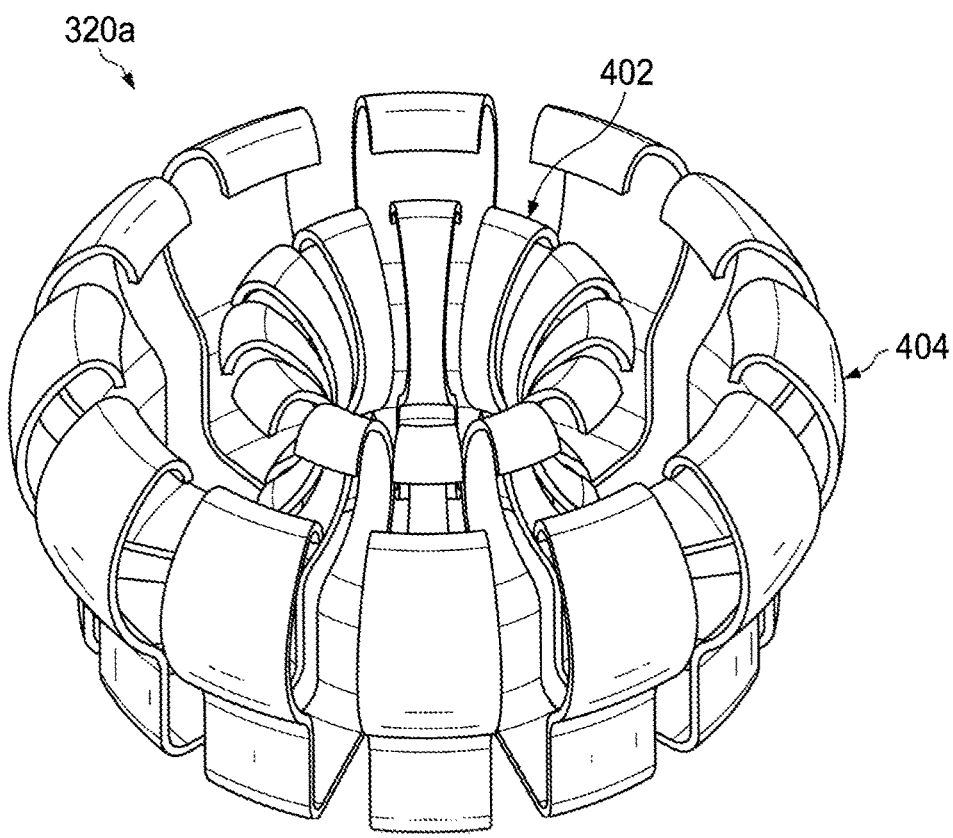
FIGS. 4, 5 illustrate respective conductive ground passes of the static resistant fan apparatus.

FIG. 4 illustrates a perspective view of the conductive ground pass 320a. The conductive ground pass 320a can include a plurality of flexible fingers. Specifically, the conductive ground pass 320a can include a plurality of inner flexible fingers 402 (or inner fingers 402) and a plurality of outer flexible fingers 404 (or outer fingers 404). In some examples, the inner fingers 402 are connected (coupled) to respective outer fingers 404, forming a contiguous body. The inner fingers 402, when the conductive ground pass 320a is positioned between the conducive shaft 302 and the conductive support structure 306, are in contact with the conductive shaft 302—that is, one or more of the inner fingers 402 are in contact with the conductive shaft 302. Specifically, the inner fingers 402 are flexible such that the inner fingers 402 exert a force on the conductive shaft 302 such that during rotation of the conductive shaft 302, the inner fingers 402 maintain contact with the conductive shaft 302. Furthermore, the outer fingers 404, when the conductive ground pass 320a is positioned between the conducive shaft 302 and the conductive support structure 306, are in contact with the conductive support structure 306. Specifically, the outer fingers 404 are flexible such that the outer fingers 404 exert a force on the conductive support structure 306 such that during rotation of the conductive shaft 302, the outer fingers 404 maintain contact with the conductive support structure 306. To that end, when the conductive ground pass 320a is positioned between the conductive shaft 302 and the conductive support structure 306, one or more of the fingers of the conductive ground pass 320a (the inner fingers 402 and/or the outer fingers 404) are in contact with both the conductive support structure 306 and the conductive shaft 302 at a time (concurrently/simultaneously). The conductive ground pass 320a may be positioned within a cutout of the conductive shaft 302.

Figure 5:
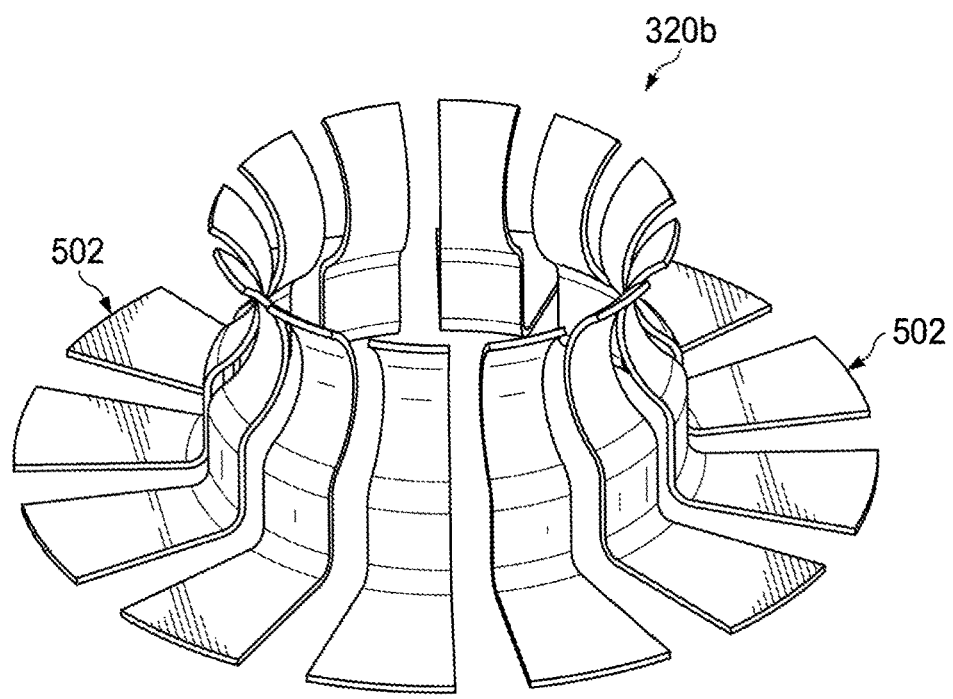

FIG. 5 illustrates a perspective view of the conductive ground pass 320b. The conductive ground pass 320b can be connected to the outer edge 332 of the conductive support structure 306. The conductive ground pass 320b can include a plurality of flexible fingers 502 (or fingers 502). One or more of the fingers 502 are in contact with the conducive support structure 306 at a time (concurrently/simultaneously). Specifically, the fingers 502 are flexible such that the fingers 502 exert a force on the conductive support structure 306 such that during rotation of the fan blades 304, the fingers 502 maintain contact with the conductive support structure 306. The conductive ground pass 320b can be connected/coupled to the PCB 318 (e.g., soldered).

To that end, as the fan blades 304 rotate about the conductive shaft 302, the fan blades 304 can be exposed to particles with an environment of the fan blades 304 and/or the fan apparatus 214. In some cases, the particles that the fan blades 304 are exposed to can include charged particles (electrically charged particles). In some cases, the charged particles can accumulate on the fan blades 304 (become positioned on the fan blades 304, and/or coupled to the fan blades 304). Specifically, due to the electric charge of the particles, one or more of the particles can become attracted/coupled to the fan blades 304. To that end, the fan apparatus 214 can provide a path to ground for the charged particles to minimize, reduce, and/or prevent accumulation of the particles (e.g., dust) on the fan blades 304 (from being positioned on, or coupled with, the fan blades 304). That is, the fan apparatus 214 can provide a path to ground for the charged particles to discharge to system ground.

In particular, the combination of the conductive shaft 302, the conductive support structure 306, the conductive ground passes 320a, 320b, and the ground wire 322 can provide a path to ground for the fan blades 304. Specifically, each of the conductive shafts 302, the conductive support structure 306, the conductive ground passes 320, and the ground wire 322 are conductive. As a result, the conductive shafts 302, the conductive support structure 306, the conductive ground passes 320, and the ground wire 322 provide a path for charged particles to discharge to ground. Specifically, the charged particles that are attracted/coupled to the fan blades 304 can discharge to ground through the path—from the fan blades 304 to the conductive shaft 302 to the conductive ground pass 320a to the conductive support structure 306 to the conductive ground pass 320b to the ground wire 322.

Figure 6:
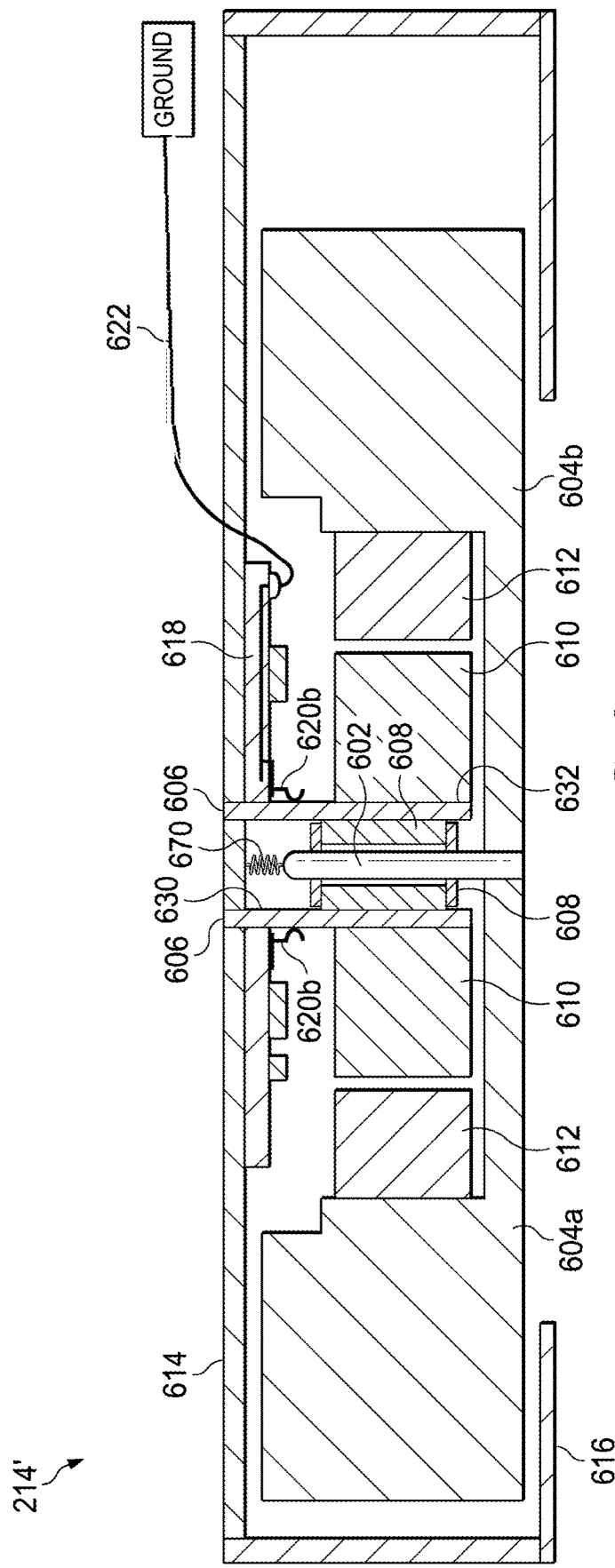

FIG. 6 illustrates a further implementation of the fan apparatus, shown as fan apparatus 214'. The fan apparatus 214' can include a conductive shaft 602, a first conductive fan blade 604a, a second conductive fan blade 604b (collectively referred to as conductive fan blades 604 or fan blades 604), a conductive support structure 606, bearing 608, stators 610, magnets 612, a base 614, a fan cover 616, a printed circuit board (PCB) 618, a conductive ground pass 620b, and a ground wire 622; similar to the conductive shaft 302, the first conductive fan blade 304a, the second conductive fan blade 304b, the conductive support structure 306, the bearing 308, the stators 310, the magnets 312, the base 314, the fan cover 316, the PCB 318, the conductive ground pass 320b, and the ground wire 322 of FIG. 3.

The fan apparatus 214' can further include a spring mechanism 670. The spring apparatus 670 can be positioned between the conductive shaft 602 and the conductive support structure 606. The spring apparatus 670 can be conductive. To that end, as the blades 604 rotate about the conducive shaft 602, the spring mechanism 670 can compensate for any movement of the blades 604 in a direction perpendicular to the rotation of the blades 604. Furthermore, the combination of the conductive shaft 602, the conductive spring apparatus 670, the conductive support structure 606, the conductive ground passes 620b, the printed circuit board 618, and the ground wire 622 can provide a path to ground for the fan blades 604. Specifically, each of the conductive shaft 602, the conductive spring apparatus 670, the conductive support structure 606, the conductive ground pass 620b, the printed circuit board 618, and the ground wire 622 are conductive. As a result, the conductive shaft 602, the conductive spring apparatus 670, the conductive support structure 606, the conductive ground pass 620b, the printed circuit board 618, and the ground wire 622 provide a path for charged particles to discharge to ground. Specifically, the charged particles that are attracted/coupled to the fan blades 604 can discharge to ground through the path—from the fan blades 604 to the conducive spring apparatus 670 to the conductive shaft 602 to the conductive support structure 606 to the conductive ground pass 620b to the printed circuit board 618 to the ground wire 622.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A static resistant fan apparatus, comprising:
   a conductive shaft;
   a first conductive fan blade connected to the conductive shaft and extending away from the conductive shaft;
   a second conductive fan blade connected to the conductive shaft and extending away from the conductive shaft opposite to the first conductive fan blade;
   a conductive support structure surrounding the conductive shaft, wherein an inner edge of the support structure is spaced apart from the conductive shaft a distance; and
   a conductive ground pass coupled between the conductive shaft and the support structure and spanning the distance,
   wherein the conductive shaft, the conductive support structure, and the conductive ground pass provide a path to ground for the first conductive and the second conductive fan blades.

2. The fan apparatus of claim 1, wherein the conductive ground pass includes one or more flexible fingers.

3. The fan apparatus of claim 2, wherein one or more of the one or more flexible fingers are in contact with the conductive support structure and the conductive shaft at a time.

4. The fan apparatus of claim 1, further comprising:
   an additional conductive ground pass connected to an outer edge of the conductive support structure,
   wherein the conductive shaft, the conductive support structure, the conductive ground pass, and the additional conductive ground pass provide the path to ground for the first conductive and the second conductive fan blades.

5. The fan apparatus of claim 4, wherein the additional conductive ground pass includes one or more flexible fingers.

6. The fan apparatus of claim 5, wherein one or more of the one or more flexible fingers are in contact with the conductive support structure at a time.

7. The fan apparatus of claim 4, further comprising a ground wire coupled to the additional conductive ground pass, wherein the conductive shaft, the conductive support structure, the conductive ground pass, the additional conductive ground pass, and the ground wire provide the path to ground for the first conductive and the second conductive fan blades.

8. The fan apparatus of claim 1, wherein the first conductive and the second conductive fan blades comprise electrostatic discharge (ESD) material.

9. The fan apparatus of claim 1, wherein the first conductive and the second conductive fan blades comprise a zero-charge anti-static coating on plastic.

10. The fan apparatus of claim 1, wherein the first conductive and the second conductive fan blades comprise metal.

11. An information handling system, comprising:
    a processor;

memory media storing instructions executable by the processor to perform operations;

a static resistant fan apparatus, including:

a conductive shaft;

a first conductive fan blade connected to the conductive shaft and extending away from the conductive shaft;

a second conductive fan blade connected to the conductive shaft and extending away from the conductive shaft opposite to the first conductive fan blade;

a conductive support structure surrounding the conductive shaft, wherein an inner edge of the support structure is spaced apart from the conductive shaft a distance; and a conductive ground pass coupled between the conductive shaft and the support structure and spanning the distance, wherein the conductive shaft, the conductive support structure, and the conductive ground pass provide a path to ground for the first conductive and the second conductive fan blades.

12. The information handling system of claim 11, wherein the conductive ground pass includes one or more flexible fingers.

13. The information handling system of claim 12, wherein one or more of the one or more flexible fingers are in contact with the conductive support structure and the conductive shaft at a time.

14. The information handling system of claim 11, further comprising:

an additional conductive ground pass connected to an outer edge of the conductive support structure, wherein the conductive shaft, the conductive support structure, the conductive ground pass, and the additional conductive ground pass provide the path to ground for the first conductive and the second conductive fan blades.

15. The information handling system of claim 14, wherein the additional conductive ground pass includes one or more flexible fingers.

16. The information handling system of claim 15, wherein one or more of the one or more flexible fingers are in contact with the conductive support structure at a time.

17. The information handling system of claim 14, further comprising a ground wire coupled to the additional conductive ground pass, wherein the conductive shaft, the conductive support structure, the conductive ground pass, the additional conductive ground pass, and the ground wire provide the path to ground for the first conductive and the second conductive fan blades.

18. The information handling system of claim 11, wherein the first conductive and the second conductive fan blades comprise electrostatic discharge (ESD) material.

19. The information handling system of claim 11, wherein the first conductive and the second conductive fan blades comprise a zero-charge anti-static coating on plastic.

20. The information handling system of claim 11, wherein the first conductive and the second conductive fan blades comprise metal.

* * * * *